3,031,485
STABILIZATION OF ETHYLMERCURITHIO-
SALICYLIC ACID
William N. Cannon, Greenwood, Ind., assignor to Eli Lilly and Company, Indianapolis, Ind., a corporation of Indiana
No Drawing. Filed Oct. 16, 1958, Ser. No. 767,525
9 Claims. (Cl. 260—434)

This invention relates to the stabilization of ethylmercurithiosalicylic acid and its salts.

It is known that ethylmercurithiosalicylic acid and its salts are unstable in solution, gradually deteriorating in the course of time with a concomitant loss of bactericidal or preservative action. To avoid such deterioration and thereby maintain an effective antimicrobial concentration of ethylmercurithiosalicylic acid, it has been the practice in the past to incorporate in the solution to be preserved a material whose function was to stabilize ethylmercurithiosalicylic acid. Among such stabilizers were ethanolamine, ethylenediamine, ethylenediaminetetraacetic acid, and the like. Although these stabilizers have been effective in stabilizing sodium ethylmercurithiosalicylate in solutions employed for antiseptic purposes, they fall far short of providing effective stabilization when the ethylmercurithiosaliylic acid compound is used in association with relatively impure aqueous dispersions having a high content of metal ions. Among such aqueous dispersions are many that are industrially useful, including both true solutions, for example, flood water feed for oil recovery operations, and the like, as well as colloids such as soluble oil emulsions, water-base paints, and the like. When incorporated as a preservative in such dispersions, the ethylmercurithiosalicylic acid compound may soon lose its potency, even though a sabilizer such as one listed above is also present. The reason for the rapid deterioration is not fully known, although it has been stated that the deterioration is caused primarily by the presence of copper ions in the solution. The copper ions purportedly catalyze the decomposition of the ethylmercurithiosalicylic acid by oxidative or other destructive process. It appears that the stabilizers which have been employed in the past are able to prevent the destructive effect of copper ions when only these are present in solutions of ethylmercurithiosalicylic acid, but these stabilizers are substantially incapable of mitigating the destructive effect of copper ions when other metal ions are also present in the industrial dispersions. Among these other metal ions are those of iron, magnesium, aluminum, nickel, cobalt, molybdenum, and the like.

My invention provides solutions of ethylmercurithiosalicylic acid and salts thereof which are effectively stabilized by having incorporated therein a stabilizer represented by the following formula:

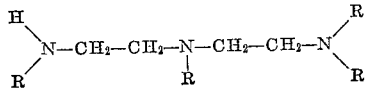

in which each R represents a member of the group consisting of hydrogen and the β-aminoethyl radical.

Illustrative compounds within the scope of the above formula include 2,2'-diaminodiethylamine; 2,2',2'''-tris-(2-aminoethyl)-amine; N,N'-di-(2-aminoethyl)-ethylenediamine; N,N,N',N'-tetrakis-(2-aminoethyl)-ethylenediamine and the like.

The stabilizers represented by the foregoing formula belong to a class of compounds referred to in the art as polydentate co-ordinating compounds by virtue of their ability to occupy at least three positions in the co-ordination sphere of a heavy metal co-ordination complex.

The amount of polydentate stabilizer required for the effective stabilization of ethylmercurithiosalicylic acid or a salt thereof in industrial dispersions is dependent in part upon the concentration of metal ions contained in the dispersion, and in part upon the nature of the metal ions. Preferably, for most efficient stabilization, the molar concentration of the stabilizer should be at least equal to the sum of the molar concentrations of all the metal ions in the dispersion, other than those ions derived from the alkali and alkaline earth metals which do not appear to have an adverse effect on the stability of ethylmercurithiosalicylic acid.

In most instances the ethylmercurithiosalicylic acid compound is effectively stabilized by incorporating in a dilute dispersion thereof a stabilizer represented by the above formula in an amount of between about 10 to about 5000 p.p.m. (parts per million by weight). Since ethylmercurithiosalicylic acid or a soluble salt thereof is customarily employed for its preservative or antimicrobial effect in the amount of about 10 to about 1000 p.p.m., the stabilizer can be employed in amounts varying from an amount equal in weight to that of the ethylmercurithiosalicylic acid compound to an amount about five times as great as the weight of the ethylmercurithiosalicylic acid compound in the dispersion. The need for an amount of stabilizer greater than the five-fold amount specified above may occasionally be encountered in dispersions containing copper ions which are also very heavily contaminated with ions of metals such as iron and cobalt.

The polyamine stabilizers of this invention effectively stabilize ethylmercurithiosalicylic acid, or one of its salts, in both aqueous and non-aqueous dispersions. In aqueous solutions, the polyamine stabilizers of this invention are effective over a relatively wide pH range, their maximum effectiveness being secured within a pH range between about pH 6 and pH 14. Accordingly, when ethylmercurithiosalicylic acid stabilized with a polyamine is to be employed for antimicrobial effect in aqueous dispersions, the pH of the dispersion preferably should be within the above specified pH range. It is to be understood, however, that a stabilizing effect can be secured with one of the above polyamines even though the pH of the ethylmercurithiosalicylic acid solution falls outside of the preferred pH range.

The stabilized ethylmercurithiosalicylic acid compositions of this invention are readily prepared simply by adding the required amount of stabilizer to the solution in which the ethylmercurithiosalicylic acid compound has been, or is to be incorporated for its antimicrobial effect. Conveniently, the ethylmercurithiosalicylic acid compound and the stabilizer can be combined in a premix or concentrate, either in solid form or in liquid solution or suspension form. The premix can then be added in the desired quantity to the dispersion to be protected from microbial attack. Such a premix contains in its preferred proportions from about one to five parts by weight of the stabilizer for each part by weight of ethylmercurithiosalicylic acid compound. A generally applicable aqueous liquid concentrate is one containing from 1 to 10 percent by weight of sodium ethylmercurithiosalicylate and from 1 to 50 percent by weight of stabilizer. Such a concentrate can be added in any amount desired to the dispersion in which antimicrobial or preservative action is desired.

The following composition is illustrative of a useful concentrate for addition to aqueous dispersions:

| | G. |
|---|---|
| Ethylmercurithiosalicylic acid | 9.3 |
| N,N'-di-(2-aminoethyl)-ethylenediamine | 18.6 |
| Water to make 410 ml. | |

Concentrates similar to the above can be prepared by employing the sodium salt of ethylmercurithiosalicylic acid in place of the free acid. Concentrates containing the sodium salt of ethylmercurithiosalicylic acid can also prepared by dissolving the free acid and 2,2',2''-tris-(2-aminoethyl)-amine in water and then neutralizing the acid with dilute aqueous sodium hydroxide.

A particularly useful concentrate is one which contains 2 percent of ethylmercurithiosalicylic acid and 4 percent of stabilizer since such a concentrate, when added at the rate of 1 oz. to 4 gal. of the material to be preserved, gives a final concentration of 50 p.p.m. of ethylmercurithiosalicylic acid and 100 p.p.m. of polyamine stabilizer.

If a non-aqueous material is to be preserved, a non-aqueous concentrate is conveniently employed. The composition of such a concentrate is illustrated as follows:

| | | |
|---|---|---|
| Ethylmercurithiosalicylic acid | lb | 10.15 |
| 2,2'-diaminodiethylamine | lb | 20 |
| Xylene | gal | 39 |

Other materials may also be present in concentrates such as those illustrated above, for example, non-mercurial preservatives such as sodium o-phenylphenate, 2-nitrobutanol, trishydroxymethylnitromethane, and the like.

Because of their unexpected stability under adverse circumstances, the compositions of this invention can be usefully employed in a wide variety of medicinal and industrial situations and are particularly advantageous where heavy contamination by copper and iron ions is to be expected.

Among the medicinal applications of the compositions of this invention are the preservation of biological materials such as vaccines, antitoxins and the like, as well as of solutions of local anesthetics, analgesics, etc. Aqueous and non-aqueous solutions of stabilized ethylmercurithiosalicylic acid are also employed as all-purpose antiseptics for rendering aseptic areas of skin prior to operation, for sterilizing cuts, abrasions and the like, as well as for the sterilization of operating rooms or other areas where sterility is desirable. For medicinal purposes, ethylmercurithiosalicylic acid is usually employed as an aqueous solution containing about 0.001 percent (w./v.) of ethylmercurithiosalicylic acid and from 0.001 to 0.1 percent (w./v.) of a polyamine stabilizer.

Among the important industrial uses to which the novel compositions of this invention can be put are the preservation of soluble oil emulsions used in machining operations, of casein modified polystyrene-butadiene emulsions for use in the paint industry, of heavy suspensions such as wood pulp, and of pastes such as library paste and finger paints. In each of the above industrial dispersions, conditions are favorable for the growth of bacteria, molds and yeasts within the time customarily needed for marketing, processing or use of the product. Protection of these industrial emulsions and suspensions against microbiological attack is a necessity, and in none of these materials is any attempt made to eliminate contamination by copper and other heavy metals; in fact, ordinary tap water in this era of copper plumbing contains about 2 p.p.m. of ionic copper. Ethylmercurithiosalicylic acid itself or ethylmercurithiosalicylic acid stabilized with the known stabilizers of the prior art is rapidly destroyed under these adverse circumstances, and up to the time of the present invention, the economically important organic emulsions or suspensions as described hereinabove could be protected against microbial contamination for only a relatively short period of time.

I claim:

1. A dispersion containing from about 10 to about 1000 parts per million of a compound selected from the group consisting of ethylmercurithiosalicylic acid and the soluble salts thereof, and about 10 to about 5000 parts per million of a polyamine stabilizer represented by the formula

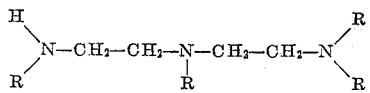

wherein each R represents a member of the group consisting of hydrogen and the β-aminoethyl radical, said dispersion being effective to prevent bacterial growth in the presence of copper ions.

2. An aqueous dispersion containing from about 10 to about 1000 parts per million of a compound selected from the group consisting of ethylmercurithiosalicylic acid and the soluble salts thereof, and about 10 to about 5000 parts per million of a polyamine stabilizer represented by the formula

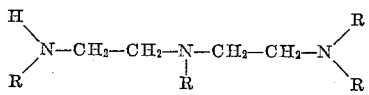

wherein each R represents a member of the group consisting of hydrogen and the β-aminoethyl radical, said dispersion being effective to prevent bacterial growth in the presence of copper ions.

3. An aqueous dispersion containing from about 10 to about 1000 parts per million of a compound selected from the group consisting of ethylmercurithiosalicylic acid and the soluble salts thereof, and about 10 to about 5000 parts per million of 2,2'-diaminodiethylamine, said dispersion being effective to prevent bacterial growth in the presence of copper ions.

4. An aqueous dispersion containing from about 10 to about 1000 parts per million of a compound selected from the group consisting of ethylmercurithiosalicylic acid and the soluble salts thereof, and about 10 to about 5000 parts per million of N,N'-di-(2-aminoethyl)-ethylenediamine, said dispersion being effective to prevent bacterial growth in the presence of copper ions.

5. The process of stabilizing a preservative selected from the group consisting of ethylmercurithiosalicylic acid and the soluble salts thereof against the action of copper ions in a dispersion containing from 10 to 1000 parts per million of said preservative, which comprises adding thereto from about 10 to about 5000 parts per million of a compound represented by the formula

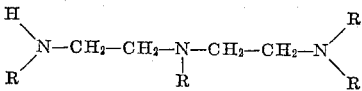

wherein each R represents a member of the group consisting of hydrogen and the β-aminoethyl radical.

6. The process of stabilizing a preservative selected from the group consisting of ethylmercurithiosalicylic acid and the soluble salts thereof against the action of copper ions in an aqueous dispersion containing from 10 to 1000 parts per million of said preservative, which process comprises incorporating in said dispersion from about 10 to about 5000 parts per million of a compound represented by the formula

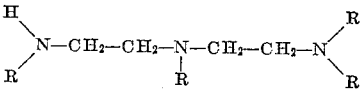

wherein each R represents a member of the group consisting of hydrogen and the β-aminoethyl radical.

7. The process of stabilizing a preservative selected from the group consisting of ethylmercurithiosalicylic acid and the soluble salts thereof against the action of copper ions in an aqueous dispersion containing from about 10 to about 1000 parts per million of said preservative, which process comprises adding to said dispersion from about 10 to about 5000 parts per million of 2,2'-diaminodiethylamine.

8. The process of stabilizing a preservative selected from the group consisting of ethylmercurithiosalicylic acid and the soluble salts thereof against the action of copper ions in an aqueous dispersion containing from about 10 to about 1000 parts per million of said preservative, which process comprises adding to said dispersion from about 10 to about 5000 parts per million of N,N-di-(2-aminoethyl)-ethylenediamine.

9. A stabilized dispersion of an antimicrobial compound of the group consisting of ethylmercurithiosalicylic acid and the soluble salts thereof, said dispersion containing, as a stabilizer against the action of copper ions, from about 1 to about 5 parts by weight with respect to the amount of said antimicrobial compound in said dispersion of a polyamine represented by the formula

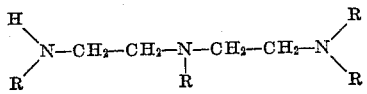

wherein each R represents a member of the group consisting of hydrogen and the β-aminoethyl radical.

References Cited in the file of this patent
UNITED STATES PATENTS
2,012,820     Kharasch _____ Aug. 27, 1935

OTHER REFERENCES

Davisson: Amer. J. Pharma., vol 128, No. 3, March 1956, pp. 104–105.

Martell: Chemistry of the Metal Chelate Compounds, 1952, Prentice-Hall, Inc., 3rd printing, 1956, pp. 471, 510, 512, 520, 521, 522.